United States Patent Office 3,586,709
Patented June 22, 1971

3,586,709
2-DIALKYLAMINOBENZHYDRYL ESTERS OF AROMATIC ACIDS
Sidney B. Richter and David P. Mayer, Chicago, Ill., assignors to Velsicol Chemical Corporation, Chicago, Ill.
No Drawing. Filed Sept. 9, 1968, Ser. No. 758,585
Int. Cl. C07c 93/26, 149/40
U.S. Cl. 260—473                              8 Claims

ABSTRACT OF THE DISCLOSURE

This invention discloses new 2-dialkylaminobenzhydryl esters of aromatic acids having the following general formula:

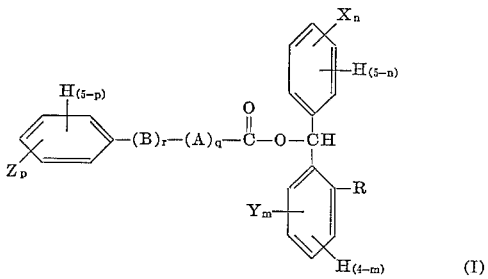
(I)

wherein X, Y and Z are independently selected from the group consisting of alkyl, alkenyl, halogen, haloalkyl, alkoxy, alkylthio, cyano, nitro and dialkylamino. A is selected from the group consisting of alkylene, alkenylene, haloalkylene and haloalkenylene. B is selected from the group consisting of oxygen, sulfur, —SO— and —SO$_2$—; $m$ is an integer from 0 to 4; $n$ and $p$ are each integers from 0 to 5; $r$ and $q$ are each integers from 0 to 1; and R is dialkylamino. This invention further discloses new acaricidal and insecticidal compositions comprising an inert carrier and a compound of the above description.

This invention relates to new compositions of matter and more particularly relates to new chemical compounds of the following general formula:

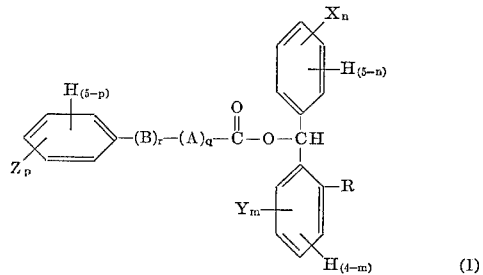
(I)

wherein X, Y and Z are independently selected from the group consisting of alkyl, alkenyl, halogen, haloalkyl, alkoxy, alkylthio, cyano, nitro and dialkylamino; A is selected from the group consisting of alkylene, alkenylene, haloalkylene and haloalkenylene B is selected from the group consisting of oxygen, sulfur, —SO— and —SO$_2$—; $m$ is an integer from 0 to 4; $n$ and $p$ are each integers from 0 to 5; $r$ and $q$ are each integers from 0 to 1; and R is dialkylamino.

In a preferred embodiment of this invention the substituents X, Y and Z are independently selected from the group consisting of lower alkyl, lower alkenyl, chlorine, bromine, lower chloroalkyl, lower bromoalkyl, lower fluoroalkyl, lower alkoxy, lower alkylthio, cyano, nitro and di(lower alkyl)amino; A is selected from the group consisting of lower alkylene, lower alkenylene, lower chloroalkylene, lower bromoalkylene, lower chloroalkenylene and lower bromoalkenylene; B is selected from the group consisting of oxygen, sulfur, —SO— and —SO$_2$—; $m$ is an integer from 0 to 2; $n$ and $p$ are each integers from 0 to 3; $r$ and $q$ are each integers from 0 to 1; and R is di(lower alkyl)amino. The term lower as used herein designates a straight or branched carbon chain of up to about 10 carbon atoms.

The compounds of the present invention are unexpectedly useful as pesticides particularly as acaricides and insecticides.

The compounds of the present invention, represented by the structural Formula I wherein B is selected from the group consisting of oxygen and sulfur or $r$ is zero, can be prepared readily from a 2-dialkylaminobenzhydrol of the formula:

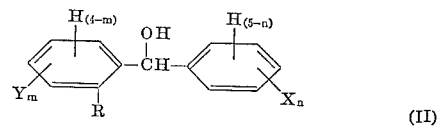
(II)

wherein X, Y, $n$, $m$ and R are as heretofore described, by reaction with an aromatic acid chloride or chloroformate of the formula:

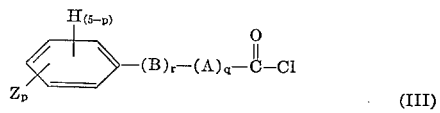
(III)

wherein B is selected from the group consisting of oxygen and sulfur and Z, A, $p$, $r$ and $q$ are as heretofore described. This reaction can be readily effected in an inert organic reaction medium such as benzene, toluene, xylene, and the like, in the presence of a base such as triethylamine or an alkali metal hydroxide or carbonate, by heating the reactants for a period of from about 1 to about 24 hours at the reflux temperature of the reaction mixture. After the reaction is completed the desired product can be recovered by first filtering the reaction medium to remove the acid acceptor salt and thereafter stripping the reaction medium of solvent to yield the product as a residue. The product can then be used as such or can be further purified by washing, recrystallizing, triturating, distillation or other common methods known in the art.

Suitable acid halides for preparing the compounds of the present invention are the chlorides or bromides of the following aromatic acids: benzoic acid, toluic acid, phenylacetic acid, ortho-chlorophenylacetic acid, meta-chlorophenylacetic acid, para-chlorophenylacetic acid, cinnamic acid, benzylacrylic acid, 2-phenylcrotonic acid, 3-phenylcrotonic acid, 4-phenylcrotonic acid, 2-phenylacrylic acid, 4-phenyl-3-butenoic acid, 2-phenylbutyric acid, 2-phenyldecanoic acid, 2-phenylhexanoic acid, 5-phenyloctanoic acid, 5-phenyl-2,4-pentadienoic acid, 5-phenyl-4-pentenoic acid, 3-phenylpropionic acid, 2-phenylvaleric acid, 2-phenoxybutyric acid, 4-phenoxybutyric acid, 2-phenoxypropionic acid, and the like.

The 2-dialkylaminobenzhydrol starting materials for preparing the compounds of the present invention can be prepared by several methods from the corresponding dialkylaminobenzophenone for example by reduction with lithium aluminum hydride. The dialkylaminobenzophenone can be prepared from the corresponding aminobenzophenone by alkylation procedures known to the art such as treatment with dimethylsulfate, formic acid and formaldehyde, alkylhalides or alkenyl halides and combinations thereof. In some cases the dialkylaminobenzophenone can be prepared from the corresponding halobenzophenone by reaction with dialkylamines such as N-methyl-N-ethylamine, N-methyl-N-isopropylamine, N-methyl-N,N-propylamine, N-methyl-N,N-butylamine, N-methyl-N-sec-butylamine, N-methyl-N-amylamine, N-ethyl-N,N-propylamine, N-ethyl-N-isopropylamine, and the like.

The aminobenzophenones can be prepared by the Friedel-Crafts reaction of a suitably substituted benzoyl chloride with a suitably substituted aniline. This reaction well known in the art can be carried out for example by first heating the substituted benzoyl chloride to a temperature of about 120° C. and adding a substituted aniline thereto, then heating the reaction mixture to about 180° C. and adding zinc chloride thereto, and finally reacting the mixture at about 220° C. for a period of from about ½ to about 2 hours. The reaction mixture is then hydrolyzed by refluxing the mixture in the presence of an acid such as a mixture of glacial acetic acid and hydrogen bromide for a period of from about 1 to about 24 hours. The product can then be dissolved in an organic solvent such as methylene chloride, washed with organic base, dried and recovered by stripping the solvent to yield the desired aminobenzophenone.

Examplary suitable anilines are: 4-chloroaniline, 4-bromoaniline, 4-methylaniline, 4-methoxyaniline, 4-nitroaniline, 4-allylaniline, 2,4-dichloroaniline, and the like.

Exemplary suitable benzoyl chlorides are: 2-methylbenzoyl chloride, 4-chlorobenzoyl chloride, 4-methoxybenzoyl chloride, 3-methoxy-4-methylbenzoyl chloride, 3,4-dimethylbenzoyl chloride, 4-methylbenzoyl chloride, 2-chlorobenzoyl chloride, 4-nitrobenzoyl chloride, 2-allylbenzoyl chloride, and the like.

The compounds of the present invention, represented by Formula I wherein B is selected from the group consisting of —SO— and —SO$_2$—, can be readily prepared by oxidation of the corresponding thioether. The oxidation of thioether into sulfoxides and sulfones is known and occurs in two steps. The product obtained depends upon the kind and quantity of oxidizing agent used. Thus the sulfoxide can be prepared under relatively mild oxidation conditions such as with hydrogen peroxide in acetic acid solution at room temperature; and the sulfone can be prepared under more vigorous conditions from the thioether or the sulfoxide such as by refluxing with potassium permanganate.

The manner in which the compounds of the present invention can be prepared readily is illustrated in the following examples.

EXAMPLE 1

Preparation of 2-amino-5-chloro-2'-methylbenzophenone

Methylbenzoyl chloride (2120 grams) was charged into a 12 liter glass reaction flask equipped with a stirrer, thermometer and reflux condenser topped by a drying tube, and was heated to about 120° C. Para-chloroaniline (1000 grams) was slowly added to the flask with continuous stirring. The reaction mixture was then heated to about 180° C. and dry zinc chloride (1252 grams) was added thereto. Thereafter the mixture was heated at 220 to 225° C. for a period of about 3½ hours. After this time the mixture was cooled to about 130° C. and an aqueous solution of a 1:1 mixture of hydrogen bromide and glacial acetic acid (5 liters; 48%) was added. The resulting mixture was refluxed, with stirring, for a period of about 17 hours. The mixture was then concentrated by stripping some of the solvent under reduced pressure and was poured over crushed ice (4 kg.). To the ice mixture was added aqueous sodium hydroxide (4 liters; 5 M) and the resulting mixture was extracted with methylene chloride (6 liters). The methylene chloride solution was washed with aqueous hydrogen chloride and with water, was dried over magnesium sulfate, filtered and evaporated. The resulting residue was vacuum distilled to yield 2-amino-5-chloro-2'-methylbenzophenone having a boiling point of 155 to 165° C. at 0.25 mm. of Hg pressure.

EXAMPLE 2

Preparation of 2-dimethylamino-5-chloro-2'-methylbenzophenone 2-amino-5-chloro-2'-methylbenzophenone (1600 grams), an aqueous solution of formaldehyde (2 liters; 38%) and formic acid (3 liters; 98%) were charged into a 12 liter glass reaction flask equipped with a stirrer and reflux condenser. The mixture was heated at reflux for a period of about 17 hours. After this time the mixture was poured over crushed ice and was extracted with ether. The ether extracts were combined and were washed with aqueous sodium hydroxide (7 liters; 3 N) and with water. The washed ether solution was dried over magnesium sulfate, filtered and was evaporated on a steam bath. The resulting residue was vacuum distilled to yield 2-dimethylamino-5-chloro-2'-methylbenzophenone having a boiling point of 150 to 160° C. at 0.2 mm. of Hg pressure.

EXAMPLE 3

Preparation of 2-dimethylamino-5-chloro-2'-methylbenzhydrol

A solution of lithium aluminum hydride (1.5 grams) in ether (100 ml.) was charged with stirring into a 250 ml. glass reaction flask equipped with mechanical stirrer, internal thermometer and reflux condenser. A solution of 2-dimethylamino-5-chloro-2'-methylbenzophenone (5.9 grams) in ether (100 ml.) was then slowly added to the flask over a period of about 15 minutes. The reaction mixture was heated at reflux for a period of about 3½ hours. The mixture was cooled to room temperature and potassium tartrate (1.5 grams) and water (6 ml.) was added thereto. The resulting mixture was allowed to stand at room temperature overnight. The mixture was filtered and distilled under reduced pressure to yield 2-dimethylamino-5-chloro-2'-methylbenzhydrol having a boiling point of 143 to 152° C. at 0.15 mm. Hg pressure.

EXAMPLE 4

Preparation of 2-dimethylamino-5-chloro-2'-methylbenzhydryl 4-methylbenzoate 2-dimethylamino-5-chloro-2'-methylbenzhydrol (2.7 grams; 0.012 mol), 4-methylbenzoyl chloride (3.9 grams; 0.025 mol) and triethylamine (2 grams) were charged into a 250 ml. glass reaction flask equipped with stirrer and reflux condenser. The reaction mixture was heated at reflux for a period of about 4 hours. After this time the mixture was cooled and filtered to remove the triethylamine hydrochloride. The filtrate was washed with aqueous sodium hydroxide and with water, was dried over magnesium sulfate and filtered. The dried solution was then stripped of solvent and the resulting residue was recrystallized from a pentane-ethanol mixture to yield 2-dimethylamino-5-chloro-2'-methylbenzhydryl 4-methylbenzoate.

EXAMPLE 5

Preparation of 2-dimethylamino-5-chloro-2'-methylbenzhdryl 2-methylbenzoate 2-dimethylamino-5-chloro-2'-methylbenzhydrol (2.7 grams; 0.012 mol), 2-methylbenzoyl chloride (3.9 grams; 0.025 mol) and triethylamine (2 grams) were charged into a 250 ml. glass reaction flask equipped with stirrer and reflux condenser. The reaction mixture was heated at reflux for a period of about 4 hours. After this time the mixture was filtered to remove the triethylamine hydrochloride which had formed. The filtrate was then washed with aqueous sodium hydroxide and water and was dried over anhydrous magnesium sulfate and filtered. The dried solution was then evaporated on a steam bath and the resulting residue triturated with pentane and then recrystallized from ethanol to yield 2-dimethylamino-5-chloro-2'-methylbenzhydryl 2-methylbenzoate as a white solid having a melting point of 62.5 to 65° C.

EXAMPLE 6

Preparation of 2-dimethylamino-5-chloro-2'-methylbenzhydryl cinnamate 2-dimethylamino-5-chloro - 2' - methylbenzhydrol (2.8 grams; 0.012 mol), cinnamoyl chloride (2 grams; 0.012 mol), triethylamine (2 grams) and benzene (50 ml.) were charged into a 250-ml. glass reaction flask equipped with stirrer and reflux condenser. The reaction mixture was heated at reflux for a period of about 5 hours. After this time the mixture was cooled and filtered to remove the triethylamine hydrochloride which had formed. The filtrate was washed with aqueous sodium hydroxide and water. The washed solution was then stripped of solvent under reduced pressure to yield 2-dimethylamino-5-chloro-2'-methylbenzhydryl cinnamate as a red glassy solid.

EXAMPLE 7

Preparation of 2-dimethylamino-5-chloro-2'-methylbenzhydryl 4-chlorobenzoate 2-dimethylamino - 5 - chloro-2'-methylbenzhydrol (2.7 grams; 0.012 mol), 4-chlorobenzoyl chloride (2 grams; 0.012 mol), triethylamine (2 grams) and benzene (50 ml.) were charged into a 250-ml. glass reaction flask equipped with stirrer and reflux condenser. The reaction mixture was heated at reflux for a period of about 5½ hours. After this time the mixture was filtered to remove the triethylamine hydrochloride which had formed. The filtered solution was then washed with aqueous sodium hydroxide and water, was dried over magnesium sulfate and filtered. The filtrate was then stripped of solvent and the resulting residue was recrystallized from a pentane-ethanol mixture to yield the desired product 2-dimethylamino-5-chloro-2'-methylbenzhydryl 4-chlorobenzoate.

EXAMPLE 8

Preparation of 2-dimethylamino-5-chloro-2'-methylbenzhydryl 2-chlorobenzoate 2-dimethylamino - 5 - chloro-2'-methylbenzhydrol (2.9 grams; 0.012 mol), 2-chlorobenzoyl chloride (2 grams; 0.012 mol), triethylamine (2 grams) and benzene (50 ml.) were charged into a 250-ml. glass reaction flask equipped with mechanical stirrer and reflux condenser. The reaction mixture was heated at reflux for a period of about 5 hours. After this time the reaction mixture was cooled and filtered to remove the triethylamine hydrochloride which had formed. The filtered solution was then washed with aqueous sodium hydroxide and water and was thereafter dried over magnesium sulfate and filtered. The dried filtrate was stripped of solvent and the resulting residue triturated with pentane and recrystallized from a pentane-ethanol mixture to yield the desired product 2-dimethylamino-5-chloro-2'-methylbenzhydryl 2 - chlorobenzoate as a yellow glass.

EXAMPLE 9

Preparation of 2-dimethylamino-5-chloro-2'-methylbenzhydryl 3-chlorobenzoate 2-dimethylamino - 5 - chloro-2'-methylbenzhydrol (2.8 grams; 0.012 mol), 3-chlorobenzoyl chloride (2 grams; 0.012 mol), triethylamine (2 grams) and benzene (50 ml.) were charged into a 250-ml. glass reaction flask equipped with a mechanical stirrer and reflux condenser. The reaction mixture was heated at reflux for a period of about 5 hours. After this time the mixture was cooled and filtered to remove the triethylamine hydrochloride which had formed. The filtered solution was then washed with aqueous sodium hydroxide and water and was dried over magnesium sulfate and filtered. The dried solution was stripped of solvent, triturated with pentane and recrystallized from ethanol to yield the desired product 2-dimethylamino-5-chloro-2'-methylbenzhydryl 3-chlorobenzoate as a yellow glass.

EXAMPLE 10

Preparation of 2-dimethylamino-5-chloro-2'-methylbenzhydryl 3-methylbenzoate 2-dimethylamino-5-chloro - 2' - methylbenzhydrol (2.8 grams; 0.012 mol), 2-methylbenzoyl chloride (2 grams; 0.012 mol), triethylamine (2 grams) and benzene (50 ml.) were charged into a 250-ml. glass reaction flask equipped with a mechanical stirrer and reflux condenser. The reaction mixture was heated at reflux for a period of about 5 hours. After this time the mixture was cooled and filtered to remove the triethylamine hydrochloride which had formed. The filtrate was then washed with sodium hydroxide and water, was dried over magnesium sulfate and filtered. The dried solution was then stripped of solvent, was triturated with pentane and recrystallized from ethanol to yield the desired product 2-dimethylamino-5-chloro-2'-methylbenzhydryl 3-methylbenzoate.

EXAMPLE 11

Preparation of 2-dimethylamino-5-chloro-2'-methylbenzhydryl 4-methoxybenzoate

2 - dimethylamino - 5-chloro-2'-methylbenzhydrol (2.8 grams; 0.012 mol), 4-methoxybenzoyl chloride (2 grams; 0.011 mol), triethylamine (2 grams) and benzene (50 ml.) were charged into a 250-ml. glass reaction flask equipped with stirrer and reflux condenser. The mixture was heated at reflux for a period of about 5½ hours. After this time the mixture was cooled and filtered to remove the triethylamine hydrochloride which had formed. The filtered solution was washed with aqueous sodium hydroxide and water, was dried over magnesium sulfate and filtered. The filtrate was evaporated under reduced pressure and the residue was dissolved in ether. The ether solution was filtered and the filtrate evaporated on a rotary evaporator under reduced pressure to yield the desired product 2-dimethylamino - 5 - chloro-2'-methylbenzhydryl 4-methoxybenzoate as a red-brown glassy solid.

EXAMPLE 12

Preparation of 2-dimethylamino-5-chloro-2'-methylbenzhydryl 2-methoxybenzoate

2 - dimethylamino - 5-chloro-2'-methylbenzhydrol (2.7 grams; 0.012 mol), 2-methoxybenzoyl chloride (2 grams; 0.011 mol), triethylamine (2 grams) and benzene (50 ml.) were charged into a 250-ml. glass reaction flask equipped with stirrer and reflux condenser. The reaction mixture was heated at reflux for a period of about 5 hours. After this time the mixture was cooled and filtered to remove the triethylamine hydrochloride which had formed. The filtrate was then washed with aqueous sodium hydroxide and water, was dried over magnesium sulfate and filtered. The dried solution was then evaporated on the steam bath under reduced pressure and the residue dissolved in hexane, filtered and evaporated to yield the desired product 2 - dimethylamino - 5-chloro-2'-methylbenzhydryl 2-methoxybenzoate as a yellow liquid.

EXAMPLE 13

Preparation of 2-dimethylamino-5-chloro-2'-methylbenzhydryl 2,3-dichlorobenzoate 2 - dimethylamino - 5 - chloro-2'-methylbenzhydrol (2.7 grams; 0.012 mol), 2,4-dichlorobenzoyl chloride (2.5 grams; 0.012 mol), triethylamine (2 grams) and benzene (50 ml.) were charged into a 250-ml. glass reaction flask equipped with stirrer and reflux condenser. The reaction mixture was heated at reflux for a period of about 17 hours. After this time the mixture was cooled and filtered to remove the triethylamine hydrochloride which had formed. The filtrate was washed with sodium hydroxide and water, was dried over magnesium sulfate and filtered. The filtrate was evaporated on a rotary evaporator under reduced pressure. The residue was triturated in pentane and recrystallized from ethanol to yield the desired product 2-dimethylamino-5-chloro-2'-methylbenzhydryl 2,4-dichlorobenzoate as a pale yellow solid having a melting point of 82 to 85.5° C.

EXAMPLE 14

Preparation of 2-dimethylamino-5-chloro-2'-methylbenzhydryl 2,3,6-trichlorobenzoate 2 - dimethylamino - 5 - chloro-2'-methylbenzhydrol (2.7 grams: 0.012 mol), 2,3,6-trichlorobenzoyl chloride (2.7 grams; 0.012 mol), triethylamine (2 grams) and benzene (50 ml.) were charged into a 250-ml. glass reaction flask equipped with stirrer and reflux condenser. The reaction mixture was heated at reflux for a period of about 17 hours. After this time the reaction mixture was cooled and filtered to remove the triethylamine hydrochloride which had formed. The filtered solution was then washed with aqueous sodium hydroxide and water, was dried over magnesium sulfate and filtered. The filtrate was evaporated under reduced pressure and the residue triturated in pentane and recrystallized from hexane to yield the desired product 2 - dimethylamino - 5-chloro-2'-methylbenzhydryl 2,3,6-trichlorobenzoate as a pink solid having a melting point of 120 to 124° C.

Additional compounds of the present invention can be prepared in a manner similar to that detailed in the foregoing examples. In the following examples are given the essential ingredients required to prepare the indicated named compounds by the procedures heretofore described.

EXAMPLE 15

2 - dimethylamino - 5 - chloro - 2' - methylbenzhydrol +benzyl chloride+triethylamine=2-dimethylamino - 5-chloro-2'-methylbenzhydryl benzoate.

EXAMPLE 16

2 - dimethylamino - 5 - chloro - 4' - methylbenzhydrol +benzoyl chloride+triethylamine=2-dimethylamino - 5-chloro -4' - methylbenzhydryl benzoate (M.P., 73–75.5° C.).

EXAMPLE 17

2 - dimethylamino - 5 - chloro-2'-methylbenzhydrol+2-nitrobenzoyl chloride+triethylamine=2-dimethylamino-5 - chloro - 2' - methylbenzhydryl 2-nitrobenzoate (M.P. 135–138° C.).

EXAMPLE 18

2 - dimethylamino - 5 - chloro-2'-methylbenzhydrol+4-nitrobenzoyl chloride+triethylamine=2 - dimethylamino-5 - chloro - 2'-methylbenzhydryl 4-nitrobenzoate (M.P., 135–137° C.).

EXAMPLE 19

2 - dimethylamino - 5 - chloro-2'-methylbenzhydrol+α-phenoxypropinoyl chloride+triethylamine=2 - dimethylamino - 5 - chloro-2'-methylbenzhydryl α - phenoxypropionate (M.P., 106–110° C.).

EXAMPLE 20

2 - dimethylamino - 5 - chloro-2'-methylbenzhydrol+3-methoxybenzoyl chloride+triethylamine=2 - dimethylamino - 5 - chloro-2'-methylbenzhydryl 3-methoxybenzoate.

EXAMPLE 21

2 - dimethylamino-5-chlorobenzhydrol+benzoyl chloride+triethylamine=2-dimethylamino - 5 - chlorobenzhydryl benzoate B.P., 175–180° C. at 0.03 mm. of Hg pressure).

EXAMPLE 22

2 - dimethylamino - 5-chlorobenzhydrol+2-chlorobenzoyl chloride+triethylamine=2-dimethylamino-5-chlorobenzhydryl 2-chlorobenzoate.

EXAMPLE 23

2-dimethylamino-5-chlorobenzhydrol+4-chlorobenzoyl chloride+triethylamine=2 - dimethylamino - 5 - chlorobenzhydryl 4-chlorobenzoate (M.P., 185–188° C.).

EXAMPLE 24

2 - dimethylamino-5-chlorobenzhydrol+2-methylbenzoyl chloride+triethylamine=2-dimethylamino-5-chlorobenzhydryl 2-methylbenzoate.

EXAMPLE 25

2 - dimethylamino - 5-chlorobenzhydrol+3-methylbenzoyl chloride+triethylamine=2-dimethylamino-5-chlorobenzhydryl 3-methylbenzoate.

EXAMPLE 26

2 - dimethylamino - 5-chlorobenzhydrol+4-methylbenzoyl chloride+triethylamine=2 - diethylamino-5-chlorobenzhydryl 4-methylbenzoate.

EXAMPLE 27

2 - dimethylamino - 5 - chlorobenzhydrol+α-phenoxypropionyl chloride+triethylamine=2 - dimethylamino-5-chlorobenzhydryl α-phenoxypropionate.

EXAMPLE 28

2 - dimethylamino - 5 - chlorobenzhydrol+phenylacetyl chloride+triethylamine=2 - dimethylamino - 5 - chlorobenzhydryl α-phenylacetate.

EXAMPLE 29

2 - dimethylamino - 5 - bromo - 2' - methoxy - 4' - chlorobenzhydrol+4-trifluoromethylbenzoyl chloride+triethylamine=2 - dimethylamino - 5 - bromo - 2' - methoxy-4'-chlorobenzhydryl 4-trifluoromethylbenzoate.

EXAMPLE 30

2 - dimethylamino - 5 - chlorobenzhydrol+4 - cyanobenzoyl chloride+triethylamine=2 - dimethylamino - 5-chlorobenzhydryl 4-cyanobenzoate (M.P. 127–129° C.).

EXAMPLE 31

2 - dimethylamino - 5 - bromo - 2' - methylbenzhydrol+ phenylthioacetyl chloride+triethylamine=2 - dimethylamino-5-bromo-2'-methylbenzhydryl phenylthioacetate.

EXAMPLE 32

2-dimethylamino-5-methylbenzhydrol+phenyl chlorothioloformate+triethylamine=2 - dimethylamino - 5-methylbenzhydryl phenylthioloformate.

Additional compounds within the scope of the present invention which can be prepared by the procedures described in the foregoing examples are:

2-diethylamino-4-methoxy-2'-allyl-4'-nitrobenzhydryl
   2,4-dichloro-6-methoxybenzoate
2-di-n-propylamino-4-methyl-3'-methylthiobenzhydryl
   4-methylthiobenzoate
2-dimethylamino-3-nitro-4-allyl-2'-ethyl-4'-dimethyl-
   aminobenzhydryl 4-isopropylbenzoate
2-di-n-pentylamino-6-trifluoromethyl-3'-bromo-4'-
   ethoxybenzhydryl 2-allyl-4-pentyloxybenzoate
2-dimethylamino-4-methylthio-2'-isopropyl-4'-ethyl-
   thiobenzhydryl α-chloro-β-phenylpropionate
2-dimethylamino-4-ethyl-3'-iodobenzhydryl
   2,4-dibromobenzoate
2-dimethylamino-5-iodo-4'-trifluoromethylbenzhydryl
   3-dimethylaminobenzoate
2-dimethylamino-3-pentenyl-5-ethoxybenzhydryl
   2-n-butyl-4-isopropylthiobenzoate
2-dimethylamino-5-n-butoxy-2'-fluorobenzhydryl
   3-bromo-4-hexylbenzoate
2-di-n-propylamino-5-trichloromethylbenzhydryl
   4-cyanobenzoate
2-dimethylamino-5-fluoro-3'-hexylbenzhydryl
   2-iodo-4-pentenylbenzoate
2-dimethylamino-4-isopropylthiobenzhydryl
   4-decylbenzoate 2-dimethylamino-6-ethoxy-4'-hexenylbenzhydryl
  4-hexylthiobenzoate
2-dimethylamino-5-ethylbenzhydryl
  4-chlorophenoxyacetate
2-dimethylamino-5-chlorobenzhydryl β-(3-isopropoxyphenyl)-n-butyrate
2-dimethylamino-5-chlorobenzhydryl β-phenyl-n-hexanoate
2-dimethylamino-5-chlorobenzhydryl 4-phenyl-3-butenoate
2-dimethylamino-5-chlorobenzhydryl 2-phenylcrotonate
2-dimethylamino-5-chlorobenzhydryl 2-phenyldecannoate
2-dimethylamino-5-bromo-2'-methylbenzhydryl
  2-benzylacrylate
2-dimethylamino-5-chlorobenzhydryl 2-phenoxybutyrate
2-dimethylamino-5-chlorobenzhydryl 4-phenylcrotonate
2-dimethylamino-5-chlorobenzhydryl α-methyl-3-chlorobenzoate
2-dimethylamino-5-n-butylbenzhydryl α-chloro-2-nitrocinnamate
2-dimethylamino-5-chlorobenzhydryl 5-phenyl-2,4-pentadienoate
2-dimethylamino-5-chlorobenzhydryl 4-phenylhexaonate
2-dimethylamino-5-chlorobenzhydryl 6-phenylhexanoate
2-dimethylamino-5-chloro-4'-methylbenzhydryl
  2-chlorophenylacetate
2-di-n-octylamino-5-chloro-2'-methylbenzhydryl
  4-phenylbutyrate
2-di-n-decylamino-5-chloro-4'-cyanobenzhydryl-5-phenylvalerate
2-di-n-butylamino-5-chloro-2'-methylbenzhydryl
  5-phenyl-4-pentenoate
2-dimethylamino-4-nitro-5-chlorobenzhdryl
  3-phenoxypropionate For practical use as acaricides or insecticides, the compounds of this invention are generally incorporated into acaricidal or insecticidal compositions which comprise an inert carrier and an acaricidally or insecticidally toxic amount of such a compound. Such acaricidal or insecticidal composition which can also be called formulations, enable the active compound to be applied conveniently to the site of the acarid or insect infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of acaricides or insecticides can be dispersed under superatmospheric pressure as aerosols. However, preferred liquid acaricidal or insecticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the acarid or insect infestation. The emulsifiers most commonly used in those concentrates are nonionic or mixtures of nonionic with anionic surface-active gents.

A typical acaricidal or insecticidal composition according to this invention is illustrated by the following example, in which the quantities are in parts by weight.

EXAMPLE 33

Preparation of a dust

Product of Example 4 _____ 10
Powdered talc _____ 90

The above ingredients are mixed in a mechanical grinder-blender and are ground until a homogeneous, free-flowing dust of the desired particle size is obtained. This dust is suitable for direct application to the site of the acarid or insect infestation.

The compounds of this invention can be applied as acaricides or insecticides in any manner recognized by the art. One method for destroying acarids or insects comprises applying to the locus of the acarid or insect infestation, an acaricidal or insecticidal composition comprising an inert carrier and, as an essential active ingredient, in a quantity which is toxic to said acarids or insects, a compound of the present invention. The concentration of the new compounds of this invention in the acaricidal or insecticidal compositions will vary greatly with the type of formulation and the purpose for which it is designed, but generally the acaricidal or insecticidal compositions will comprise from about 0.05 to about 95 percent by weight of the active compounds of this invention. In a preferred embodiment of this invention, the acaricidal or insecticidal compositions will comprise from about 5 to 75 percent by weight of the active compound. The compositions can also comprise such additional substances as other pesticides, stabilizers, spreaders deactivators, adhesives, stickers, fertilizers, activators, synergists, and the like.

The compounds of the present invention are also useful when combined with other acaricides or insecticides in the compositions heretofore described. These other acaricides or insecticides can comprise from about 5% to about 95% of the active ingredients in the compositions. Use of the combinations of these other acaricides or insecticides with the compounds of the present invention provide acaricidal and/or insecticidal compositions which are more effective in controlling acarids or insects and often provide results unattainable with separate compositions of the individual compounds. The other acaricides or insecticides with which the compounds of this invention can be used in the acaricidal or insecticidal compositions to control acarids or insects include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbonphenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl ortho 5353, and the like; organic sulfur compounds such as phenothiazine, phenoxathin, lauryl thiocyanate, [bis(2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal and nematocidal chemical compounds to form pesticidal compositions useful for the control of fungi and in some cases soil nematodes as well as acarids or insects. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate, and the like; while examples of nematodicidal compounds are chloropicrin, 0.0-diethyl 0-(2,4 - dichlorophenyl)phosphorothioate, tetrachlorothiophene, dazomet, dibromochloropropane, and the like.

The new compounds of this invention can be used in many ways for the control of acarids or insects. Acaricides or insecticides which are to be used as stomach poisons or protective materials can be applied to the surface on which the acarids or insects feed or travel. Acaricides or insecticides which are to be used as contact poisons or eradicants can be applied directly to the body of the acarid or insect, as a residual treatment to the surface on which the acarid or insect may walk or crawl, or as a fumigant treatment of the air which the acarid or insect breathes. In some cases, the compounds applied to the soil or plant surfaces are taken up by the plant, and the acarids or insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects, such as the Mexican bean beetle and the southern armyworm; the piercing-sucking insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm, worms or weevils, such as the codling moth, the alfalfa weevil, the cotton boll weevil, the pink boll worm, the plum curculio, the red banded leaf roller, the melonworm, the cabbage looper and the apple maggot, leaf miners, such as the apple leaf miner, the birch leaf miner and the beet leaf miner, and gall insects, such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites and ticks can be controlled by the compounds of this present invention, such as the red spider mite, the two-spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for acarid or insect control will depend on a variety of factors, such as the specific acarid or insect involved, intensity of the infestation, weather, type of environment, type of formulation, and the like. For example, the application of only one or two ounces of active chemical per acre may be adequate for control of a light infestation of an acarid or insect under conditions unfavorable for its feeding, while a pound or more of active compound per acre may be required for the control of a heavy infestation of acarids or insects under conditions favorable to their development.

The acaricidal activity of the compounds of the present invention was demonstrated in experiments carried out for the control of the two-spotted spider mite (*Tetranychus urticae*).

In one experiment wherein the activity of the compounds of the present invention as contact poisons was determined, the test compounds were formulated at the indicated dosages, as aqueous emulsions of acetone solutions and were sprayed onto Henderson bush lima bean plants, each infested with about 100 adult two-spotted spider mites. The treated plants were then placed into a holding room and were supplied with their daily requirement of water and light. After a period of 5 days the mortality of the mites is determined and is rated on a percentage basis in comparison to untreated controls. The results of this experiment are shown in Table I.

TABLE I

| Test compound | Concentration of test compound in p.p.m. | Percent mortality of two-spotted spider mites |
|---|---|---|
| Product of Example: | | |
| 4 | 3,500 | 99 |
| 5 | 3,500 | 100 |
| 7 | 3,500 | 88 |
| 8 | 3,500 | 98 |
| 9 | 3,500 | 98 |
| 10 | 3,500 | 100 |
| 11 | 3,500 | 100 |
| 12 | 3,500 | 100 |
| 13 | 3,500 | 88 |
| 15 | 3,500 | 95 |
| 16 | 3,500 | 92 |
| 19 | 3,500 | 92 |
| 20 | 3,500 | 95 |
| 21 | 3,500 | 100 |
| 22 | 3,500 | 100 |
| 23 | 3,500 | 100 |
| 24 | 3,500 | 100 |
| 25 | 3,500 | 96 |
| 26 | 3,500 | 90 |
| 27 | 3,500 | 97 |
| 28 | 3,500 | 100 |

The insecticidal utility of some of the compounds of the present invention was demonstrated in experiments carried out for the control of the housefly (*Musca domestica*). In this experiment each of fifty flies was contacted with a test compound by applying 1 ml. of test formulation, containing the indicated concentrations of active compound, to the dorsum of its thorax. The flies were then placed in a wire mesh cage where they were supplied with sugar syrup. At the end of a 24 hour period the mortality of the flies was observed and rated in comparison to a control. The results of this experiment are shown in Table II.

TABLE II

| Test compound | Concentration of test compound in p.p.m. | Percent control of houseflies |
|---|---|---|
| Product of Example: | | |
| 8 | 3,500 | 100 |
| 21 | 3,500 | 96 |
| 22 | 3,500 | 100 |
| 23 | 3,500 | 96 |
| 24 | 3,500 | 94 |
| 25 | 3,500 | 84 |
| 27 | 3,500 | 100 |
| 28 | 3,500 | 92 |

We claim:
1. A compound of the formula

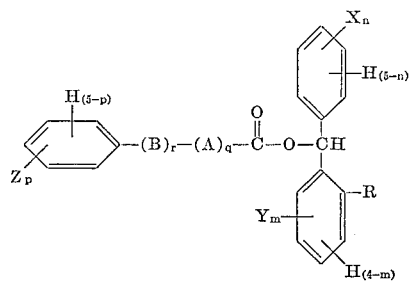

wherein X, Y and Z are independently selected from the group consisting of alkyl, alkenyl, halogen, haloalkyl, alkoxy, alkylthio, cyano, nitro and dialkylamino; A is selected from the group consisting of alkylene, alkenylene, haloalkylene and haloalkenylene; B is selected from the group consisting of oxygen, sulfur, —SO— and —SO$_2$—; $m$ is an integer from 0 to 4; $n$ and $p$ are each integers from 0 to 5; $r$ and $q$ are each integers from 0 to 1; and R is dialkylamino.

2. The compound of claim 1, 2-dimethylamino-5-chlorobenzhydryl benzoate.

3. The compound of claim 1, 2-dimethylamino-5-chloro-2'-methylbenzhydryl benzoate.

4. The compound of claim 1, 2-dimethylamino-5-chlorobenzhydryl 2-chlorobenzoate.

5. The compound of claim 1, 2-dimethylamino-5-chlorobenzhydryl 2-methylbenzoate.

6. The compound of claim 1, 2-dimethylamino-5-chloro-2'-methylbenzhydryl 3-methoxybenzoate.

7. The compound of claim 1, 2-dimethylamino-5-chloro-2'-methylbenzhydryl α-phenoxypropionate.

8. The compound of claim 1, 2-dimethylamino-5-chloro-2'-methylbenzhydryl 3-methylbenzoate.

References Cited

Ciuffarin et al. J. Am. Chem. Soc., 90, 3594 (1968).

LORRAINE A. WEINBERGER, Primary Examiner

J. F. TERAPANE, Assistant Examiner

U.S. Cl. X.R.

260—544, 570, 465, 477, 470, 472, 408, 410.5; 424—308, 309